United States Patent
Bildhaeuser et al.

(10) Patent No.: US 8,170,989 B2
(45) Date of Patent: May 1, 2012

(54) METHOD AND SYSTEM FOR DOCUMENT MANAGEMENT AND EXCHANGE

(75) Inventors: Hans-Juergen Bildhaeuser, Aidlingen (DE); Andreas Limmer, Deckenpfronn (DE)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/101,184

(22) Filed: Apr. 11, 2008

(65) Prior Publication Data

US 2009/0024668 A1  Jan. 22, 2009

(30) Foreign Application Priority Data

Jul. 16, 2007  (EP) .................................... 07112562

(51) Int. Cl.
*G06F 17/30* (2006.01)

(52) U.S. Cl. ........................................ 707/638; 707/806

(58) Field of Classification Search ........... 707/999.002, 707/200, E17.009, 966, 999.009, 999.203, 707/638, 806

See application file for complete search history.

(56) References Cited

U.S. PATENT DOCUMENTS

| | | | | |
|---|---|---|---|---|
| 5,267,047 A * | 11/1993 | Argenta et al. | ............... | 358/400 |
| 6,823,398 B1 * | 11/2004 | Lee et al. | ........................... | 710/5 |
| 2005/0044399 A1 * | 2/2005 | Dorey | ........................... | 713/200 |
| 2006/0026162 A1 * | 2/2006 | Salmonsen et al. | ............. | 707/10 |
| 2006/0031335 A1 | 2/2006 | Carey | | |
| 2006/0036696 A1 | 2/2006 | Maresh | | |
| 2006/0149795 A1 * | 7/2006 | Gillespie et al. | ............. | 707/203 |
| 2006/0161562 A1 * | 7/2006 | McFarland et al. | ........... | 707/100 |
| 2007/0016586 A1 * | 1/2007 | Samji et al. | ...................... | 707/10 |
| 2007/0239695 A1 * | 10/2007 | Chakra et al. | ..................... | 707/4 |
| 2008/0034268 A1 * | 2/2008 | Dodd et al. | ................... | 714/755 |
| 2008/0040388 A1 * | 2/2008 | Petri et al. | .................. | 707/104.1 |
| 2008/0071728 A1 * | 3/2008 | Lim | ....................................... | 707/1 |
| 2008/0126396 A1 * | 5/2008 | Gagnon | ........................ | 707/102 |
| 2008/0294992 A1 * | 11/2008 | Liang et al. | ................... | 715/733 |
| 2010/0036863 A1 * | 2/2010 | Koifman et al. | .............. | 707/101 |

* cited by examiner

*Primary Examiner* — James Trujillo
*Assistant Examiner* — Soheila Davanlou
(74) *Attorney, Agent, or Firm* — Elissa Y. Wang; Edell, Shapiro & Finnan, LLC

(57) ABSTRACT

The present invention embodiments pertain to managing and exchanging documents. A descriptor is added to an original document, wherein the descriptor includes at least one document identifier representing a logical subject of the document. Modifications to a document being sent or received are identified based on comparing the descriptor of the sent or received document and the descriptor of the original document. The modifications are introduced into the original document to become a single master document of consolidated information relating to the same logical subject.

25 Claims, 4 Drawing Sheets

METHOD AND SYSTEM FOR DOCUMENT MANAGEMENT AND EXCHANGE

CROSS REFERENCE TO RELATED APPLICATIONS

This application claims priority under 35 U.S.C. §119 to European Patent Application No. 07112562.9 filed on Jul. 16, 2007, entitled "A Method and a System for Document Management and Exchange," the entire contents of which are hereby incorporated by reference.

BACKGROUND

The present invention relates to document management and exchange, especially with respect to mailing systems.

Mailing systems (e.g., Lotus Notes, Microsoft Outlook, Mozilla Thunderbird and others) offer the option to add information to received electronic mail (email) and forward the modified email. Another offered option is to reply with history, which has the same logical and physical effect as forwarding with added information.

Such added information can be textual and/or media data (e.g., graphics or attached files). New information can be added on top to the original email or embedded into the existing data. Even the subject of the email might be modified.

Usually, the original email remains in the mailing system as well as the modified email. When the sent email is modified and returned by the addressees, the new version is received and stored in the mailing system in addition to the original and previously modified versions. After sending the email back and forth among the participants of the communication, the contents diverge.

Extra effort is needed to synchronize the communication stream and bring all pieces of information together in the correct sequence and to concentrate the information. Thus, manual documentation management must be performed to avoid effort searching and the loss of data when deleting subsets of the collection of emails from the mailing system.

Besides the above organizational aspect of the document management, redundant information is kept in the mailing system, which wastes disk storage and processing time.

U.S. Patent Application Publication No. US 2006/0036696 discloses an email system, wherein tags are incorporated into emails to allow for identification of emails belonging to the same email family. Relationships in such an email family are shown to a user via a graphical user interface. The system further allows for trimming of the email family (i.e., all emails except the last generation email may be deleted, assuming that the other emails are contained in the last generation email).

U.S. Patent Application Publication No. US 2006/0031335 discloses an email system, which shows a status of contained emails (i.e., earlier emails contained in the current email) to inform the user whether the user has received/read/deleted the contained emails and also to inform the user whether the contained emails are identical to the emails the user has received earlier. The system further allows the user to manage the contained emails, multiple contained emails, or the whole email.

However, in both of the above mentioned cases, the user still has to manually manage emails with limited facilities. The user may further lack information since some branches of the email discussion may have not involved the user as a recipient.

BRIEF SUMMARY

In one aspect of the present invention embodiments, there is provided a method of consolidating information in a document management and exchange system. The method includes adding a descriptor to an original document, wherein the descriptor comprises at least one document identifier, which represents a logical subject of the document. Modifications in a further document are identified with respect to the original document based on comparing a descriptor of the further document and the descriptor of the original document. A master document containing the original document and the modifications is maintained, where the master document provides consolidated information relating to the logical subject. The present invention embodiments further include a document management and exchange system and a program product apparatus for consolidating information in substantially the same manner described above.

The above and still further features and advantages of the present invention will become apparent upon consideration of the following definitions, descriptions and descriptive figures of example embodiments thereof, wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
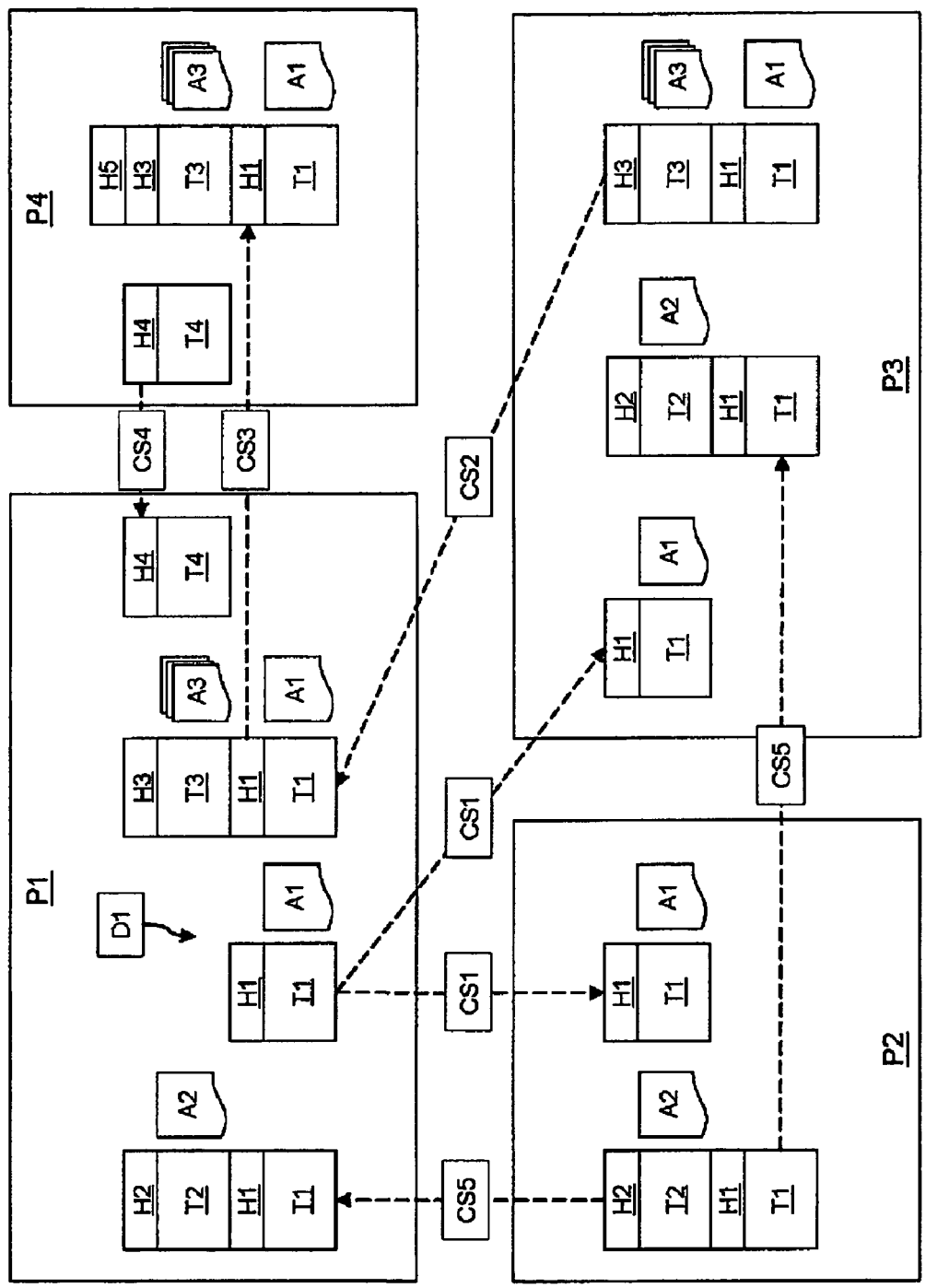
FIG. 1 illustrates a common communication scenario using emails for discussing a logical subject amongst participants.

Within the context of this description, a 'document' is meant to be a representation of any data perceptible to a user having any kind of arbitrary format, which gets communicated via electronic media. Documents may especially take the form of an email based on textual, graphical, audio and/or video data. This type of document is often referred to throughout the following description by way of example and for explanatory purposes.

An aspect of a method of the present invention embodiments includes all elements of a document exchange being consolidated into one document (master copy), which makes it easier for all participants to perceive and manage the total discussion. Instead of running into situations where, for example, diverging emails accumulate in the mailing system, the original email may be maintained and synchronized with all sent and received modifications resulting in a single master document. The user has all relevant information at hand without manual interaction or any search activity for information within the collection of emails dealing with the same subject.

In case the original document includes a collection of documents, a descriptor may be added to each of them. Synchronization is thus extended to subsets of documents, which also allows management thereof.

For maintaining a communication history, modifications to the master document may be stored in their timely or time-ordered (chronological) sequence. This is done by using the descriptor in a tracking section, wherein at least the descriptor of an originating document must be part of the tracking section for each incoming and outgoing document.

In case of an email system, the descriptor/tracking section of the outgoing email (e.g., forwarded or replied email) still contains the tracking section of the forwarded or replied-to email. This historical tracking section comprises at least the descriptor of the originating email. The appropriate master copy can be located by screening the tracking sections of, for example, all available email discussions until a descriptor of a master copy matches the originating descriptor of the outgoing email.

The same processing is performed to associate incoming emails. If an incoming email cannot be associated to one of the available email discussions, a new email discussion/master copy is created. A new logical subject is generated for this master copy. Besides the automatic assignment of an incoming mail to a logical subject/master copy, the user can be prompted in a user interface to confirm the association or to correct it.

The screening of all available email discussions may be avoided by maintaining an index for each logical subject, which comprises descriptors and email discussions. A look up in the indexes can be performed to quickly locate the appropriate master copy.

New information may be added or merged into the master document upon receipt of a modification to the document resulting in a concentrated document. This enables preservation of the correct logical association of information within the master document. Thereafter, the modifications and redundant information are deleted from the document exchange system automatically, while only the master is kept.

If a contained email is modified, some new text is added or existing text is deleted. In order to maintain data integrity and to be able to track these kinds of modifications in timely order, the original email is kept unmodified in the master copy and the modified contained emails are treated as separate emails.

During outbox processing, new descriptors are generated for the modified contained emails and marked as type modifications. The new descriptors contain a link to the descriptors of the original contained emails. The descriptors for the original contained emails are also part of the outgoing mail to make sure the recipient can associate the modifications. Upon receipt and display of modified contained emails, the reference/link to the original email, which is part of the descriptors, can be used to retrieve the original email from the master copy, if present, and highlight the differences/modifications when the modified email is viewed.

After checking that information contained in previous documents is also contained in the new one, the older versions may be deleted automatically. This allows for the removal of redundant information from the master document and, thus, saves storage.

A first step to approach the above solution is to delete previous versions from the mailing system as a modified version is received (i.e., redundant documents and/or attachments to the documents are discarded from the master document).

The descriptor/tracking section may be inherited by each document extracted from the master document or appended to the master document when used for communication. Each addressee is thus shown the complete information associated with a logical subject of discussion. By comparing the present documents with documents indicated in the descriptor, each participant may be aware of missing documents.

For safeguarding consistency of documents among the participants of an ongoing discussion, the descriptor may further comprise administrative information on properties of each document, and the master document may be synchronized based on comparing the descriptor of the received document and the descriptor of the master document. Properties of a document may comprise a timestamp, an attachment name or a document status, which help to identify and to compare documents.

As for access control, synchronization may partly or completely be denied based on authorization information relating to individual participants. This is done by maintaining an access matrix indicating which parts of the master document each participant involved in the discussion is allowed to access. A participant may be provided access to the master document based on the access matrix.

When new modifications are needed to be sent to the addressees, either complete master documents or modifications to the master documents may be sent or received. Modifications may also include selected subsets of documents. This enables restriction to documents, which are actually relevant to an ongoing discussion. Furthermore, network traffic is reduced.

For some instances, it may be desired to keep documents in secret to avoid spreading information to participants without a 'need to know'. Therefore, a subset of documents contained in the master document may be marked as hidden and, therefore, not be listed in the descriptor/tracking section when used for communication.

The present invention embodiments can be realized in hardware, software, or a combination of hardware and software. Any kind of computer system or other apparatus adapted for carrying out the methods described herein may be employed. A typical combination of hardware and software could be a general-purpose computer system with a computer program that, when being loaded and executed, controls the computer system such that it carries out the methods described herein.

The present invention embodiments can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability to perform a particular function, either directly or after either or both of the following, namely conversion to another language, code or notation, or reproduction in a different material form.

Furthermore, the methods described herein may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include, but are not limited to, a semiconductor or solid-state memory, magnetic tape, a removable computer diskette, a random access memory (RAM), a read-only memory (ROM), a rigid magnetic disk and an optical disk. Current examples of optical disks include a compact disk read only memory (CD-ROM), compact disk read/write (CD-RW), and DVD.

A further aspect of the present invention embodiments includes a document management and exchange system that is adapted to consolidate information in substantially the same manner described above. The document exchange system is preferably used as an email system.

A feature of the system of an embodiment of the present invention includes the related information being collected in a single master document. This provides for a single source of communicated information, which can be handled effectively. A user can quickly overlook subject related information without having to work through, for example, an email box to gather the complete information from related emails because of the different communication paths an email was forwarded and appended.

The descriptor of the system may comprise at least one document identifier, which relates to only part of a document. The contents of a document can thus be described more precisely. Mapping of documents, according to their logical subject is improved therewith.

For establishing close description of documents, the document identifier may relate to one of a header section, a text area or an attachment of a document. Since structures are used, which are usually present in a document, otherwise partitioning the document becomes superfluous.

The document identifier may furthermore be independent from the textual description of a document which improves detection of logical subjects that are abstract from the mere text of a document. For instance, an email is identified by a unique document identifier to be independent from the textual subject of the email.

In order to quickly ascertain which master document is addressed by, for example, an incoming email, the system may further comprise an index table for locating the master document via indexes, each of which is assigned to a logical subject. This accelerates the system performance and the users' acceptance thereof.

For data integrity/data integrity reasons, the system may further comprise a synchronizing unit for synchronizing the received document with the master document based on comparing the descriptor of each of the documents, where the descriptor further comprises administrative information on properties of each document.

The administrative information may comprise at least one of a time stamp, an attachment name or a document status. Based on such information, matching documents can be detected by comparison thereof.

The system may also comprise a controlling unit for controlling access to a master document based on a data access matrix for each participant, which holds authorization information on access to master documents of the participants. The matrix is based on the descriptors of the master documents and a distribution list. Thus, spreading of information can be restricted to the concerned organizational units or levels only (e.g., project groups, departments, and management).

Master documents of individual participants may be stored in a distributed computer network. In a distributed environment, there is typically not one single email server storing all the email discussion. The email discussions can be spread among the participants and reside on local storage media. Each participant can maintain their individual email discussions.

However, in a centralized environment, the system can be implemented with one comprehensive master copy on the email server side. In this fashion, the email server can be seen as a special participant in the communication that gets knowledge of each communication among the other participants because it is on each distribution list per default and cannot be removed. The server is also the owner of the access matrix describing the knowledge status for each participant. The participant connects to the server to get the participant user-specific access matrix to access the documents. Thus, the participants get a user-specific view of the email discussion. Each participant can send synchronization requests to the server storing the comprehensive master document to keep the user-specific master document up-to-date.

Although this minimizes the storage consumption and offers one single synchronization point user-specific master documents at the participant side, each participant is enabled to work with the email discussion offline.

As for the master document, one master copy of the email discussion is sufficient in a centralized environment and makes management of the access matrix easier. A user-specific master copy can be achieved by creating a local replica while using the access matrix as filter criteria to avoid unintended spreading of hidden documents. The personalized replica can be used to work offline. The present invention embodiments support, but are not limited to, a single master copy on an email server. Multiple, even different, master copies can coexist in a distributed environment.

The system may support email discussion management in distributed environments, and is not limited to a centralized implementation. Instead, the users and system administrators should be able to decide in which mode the system should work after taking into account the advantages and disadvantages of the different modes.

Consolidating information according to the present invention embodiments is explained in more detail throughout the following by way of an example. FIG. 1 shows a common communication scenario using emails for discussing a logical subject between participants P1, P2, P3 and P4. As for the naming conventions, H1, H2, H3, H4 and H5 (Header) denotes the header section of a document or email storing sender, receiver, date, subject, etc. A text area T1, T2, and T3 (Text) designates the section of a document or email storing information, which is intended to be shared amongst participants of the communication. A document D1, for example, comprises header H1 and text area T1. Attachments A1, A2 and A3 (Attachment) are separate data stored in a file, which can be sent together with a document. Modifications to a document are named M (Modification) depending from the changes thereto (e.g., modification M2 defined below adds a header H2 and a text section T2 to the original document D1).

The term email in this description is synonymous to an arbitrary format of a document, which gets communicated via electronic media. The document includes a header H1, H2, H3, H4 and H5, a text area T1, T2 and T3, and may further contain attached files A1, A2 and A3. A document can also comprise a collection of documents.

As to FIG. 1, in a first step CS1 (Communication Step) of the communication, participant P1, referred to as the originator of the communication path, creates an email document D1 comprising a header H1 and a text area T1 with a file A1 attached and sends it to participant P2 and participant P3.

In a second step CS2, participant P3 adds as remarks a header H3 and text area T3 to the document D1, attaches a set of files A3 and replies with history and with attachment to participant P1. Thus, participant P1 receives the original document D1 including the original attached file A1 plus the addendum from participant P3. Participant P1 and participant P3 now have two copies of the original document.

In a third step CS3, participant P1 forwards the document received from participant P3 to participant P4 without further text and without attachment. Thus, just header H5 is appended. Participant P1 decides to forward the document without keeping a copy. Thus, participant P1 loses knowledge to whom data was sent because header H5 is not stored.

In a fourth step CS4, participant P4 replies to participant P1 without history for the same subject. Thus, just header H4 and text area T4 are transmitted.

In a fifth step CS5, participant P2 adds as remarks header H2 and text area T2 to the original document D1, attaches a file A2 and replies with history but with attachment to participant P1, while concurrently forwarding a copy to participant P3. Participant P1 and participant P3 now have three copies of the original document D1.

The above scenario leads to the following distribution of data among the four participants P1, P2, P3 and P4, which is shown in Table 1. The table is referred to as the document access matrix.

TABLE 1

| Data | Participant P1 | Participant P2 | Participant P3 | Participant P4 |
|---|---|---|---|---|
| Document D1 (H1 & T1) | 3 redundant | 2 redundant | 3 redundant | 1 |
| Attachment A1 | 2 redundant | 1 | 2 redundant | 1 |
| Modification M2 (H2 & T2) | 1 | 1 | 1 | 0 no access |
| Attachment A2 | 1 | 1 | 1 | 0 no access |
| Modification M3 (H3 & T3) | 1 | 0 no access | 1 | 0 no access |
| Attachment A3 | 1 | 0 no access | 1 | 0 no access |
| Header H5 | 0 no access | 0 no access | 0 no access | 1 |
| Document D4 (H4 & T4) | 1 | 0 no access | 0 no access | 1 |

The data access matrix is normalized if it contains a value of one in each field. This indicates that each participant has access to all information without redundancy. The 'Data' column includes complete documents, a single header or an attachment. The numbers at the intersection of a table row and column show how often the same data are stored for the participant. A value of zero indicates that the participant has no access to or knowledge about the information. A value of one indicates that the participant has access to the information without redundancy, which is the ideal value. A value greater than one indicates that copies of the data are maintained. This increases resource consumption and maintenance effort. The data access matrix demonstrates the problems occurring in the communication in view of redundant and incomplete data due to a lack of access.

The present invention embodiments accommodate redundant data as follows.

Before attempting to reduce redundant information, the information must be recognized as redundant. This can be achieved by appending a new section at the top of the documents. The new section includes descriptors for the contents of the document. If a document comprises a collection of documents each single document is represented by a descriptor. A descriptor includes at least the following fields, which are shown in Table 2.

TABLE 2

| Descriptor field | Purpose | Remarks |
|---|---|---|
| Timestamp | Maintain documents ordered in timely sequence | |
| Header Identifier | Uniqueness, identify redundancy/duplicates | |
| Text Area Identifier | Uniqueness, identify redundancy/duplicates | |
| Attachment Identifier | Uniqueness, identify redundancy/duplicates | |
| Attachment Name | Localize file in file system | |
| Document Status | Control processing of document | Status can be Reference/Contents/Modification/Hidden |

The contents of two documents can easily be compared by comparing the descriptors. If the descriptors match the corresponding part of the document, the document is redundant.

Depending on the desired functionality of an application, the descriptor can be extended, for example, to support navigation within a document or highlighting.

The descriptor section can further be used to track the communication and to serve as a table of contents.

Deleting duplicates represents a partial but simple solution. To solve the problem with redundant data, the collection of information available at a participant must be cleaned. This can be realized by deleting documents and attachments, which are part of the new incoming document. The following algorithm describes a manner to maintain continuous clean-up (Housekeeping).

Upon receipt of a document (in-box processing), the tracking section of the incoming document is read. It is then checked whether information contained in the received document matches a document already available in the repository of the recipient. This also applies for attachments. Subsequently, if it matches a document/attachment in the repository, the matching document/attachment from the repository is deleted when the incoming document is stored.

Upon send/submit processing of a completed document (out-box processing), if the modified document is either of type forward with history or reply with history and an option is set to keep a copy of the document to be sent, the original document is deleted from the repository. Attachments are handled in a similar fashion.

Applying this algorithm to the scenario described in FIG. 1 results in a significant data reduction, which is shown in Table 3.

TABLE 3

| Data | Participant P1 | Participant P2 | Participant P3 | Participant P4 |
|---|---|---|---|---|
| Document D1 (H1 & T1) | 2 redundant | 1 | 2 redundant | 1 |
| Attachment A1 | 1 | 1 | 1 | 1 |
| Modification M2 (H2 & T2) | 1 | 1 | 1 | 0 no access |
| Attachment A2 | 1 | 1 | 1 | 0 no access |
| Modification M3 (H3 & T3) | 1 | 0 no access | 1 | 0 no access |
| Attachment A3 | 1 | 0 no access | 1 | 0 no access |
| Header H5 | 0 no access | 0 no access | 0 no access | 1 |
| Document D4 (H4 & T4) | 1 | 0 no access | 0 no access | 1 |

However, some redundancy remains because of the divergence of documents. Compressing/merging a collection of documents to a master document represents a comprehensive but complex solution. To solve the problem with redundant data, the collection of information available at a participant is compressed such that a piece of information exists only once and remains in timely order within the communication path. The resulting document is referred to as the master document.

In addition to the header section, a new tracking section is appended to the document to be able to track the communication path and maintain a data access matrix. The tracking section includes unique identifiers for each piece of added information. The following algorithm describes a manner to compress and maintain the master document.

Upon send/submit processing of a completed document (out-box processing), a unique text identifier is calculated from the contents of the text area and is stored in the tracking section. The identifier may be an MD5 value (Message Digest Algorithm 5) or the like. In addition, the starting point of the text area within the document (offset) and the length of the text section are also stored in the tracking section. A unique attachment identifier is calculated from the contents of the attachment, if any. A CRC (Cyclic Redundancy Check) or the like can be used to build this identifier. The attachment identifier and the file size are stored in the tracking section. A unique header identifier is calculated from the contents of the header section, which may also be an MD5 value or the like. The text header identifier, a timestamp, and a time zone offset are stored in the tracking section. The processed document is sent and the master document is updated accordingly.

Upon receipt of a document (in-box processing), the tracking section of the incoming document is read. It is checked whether information stored in the received document is already available in the master document. If it is not available, the new information is stored in the master document at the appropriate location to maintain timely order. If it is already available, no further action is required. The updated master document may be opened with new parts highlighted and the cursor may be placed to the most current information.

Applying this algorithm to the scenario described in FIG. 1 results in a significant data reduction without any redundancy at any participant.

Figure 2:
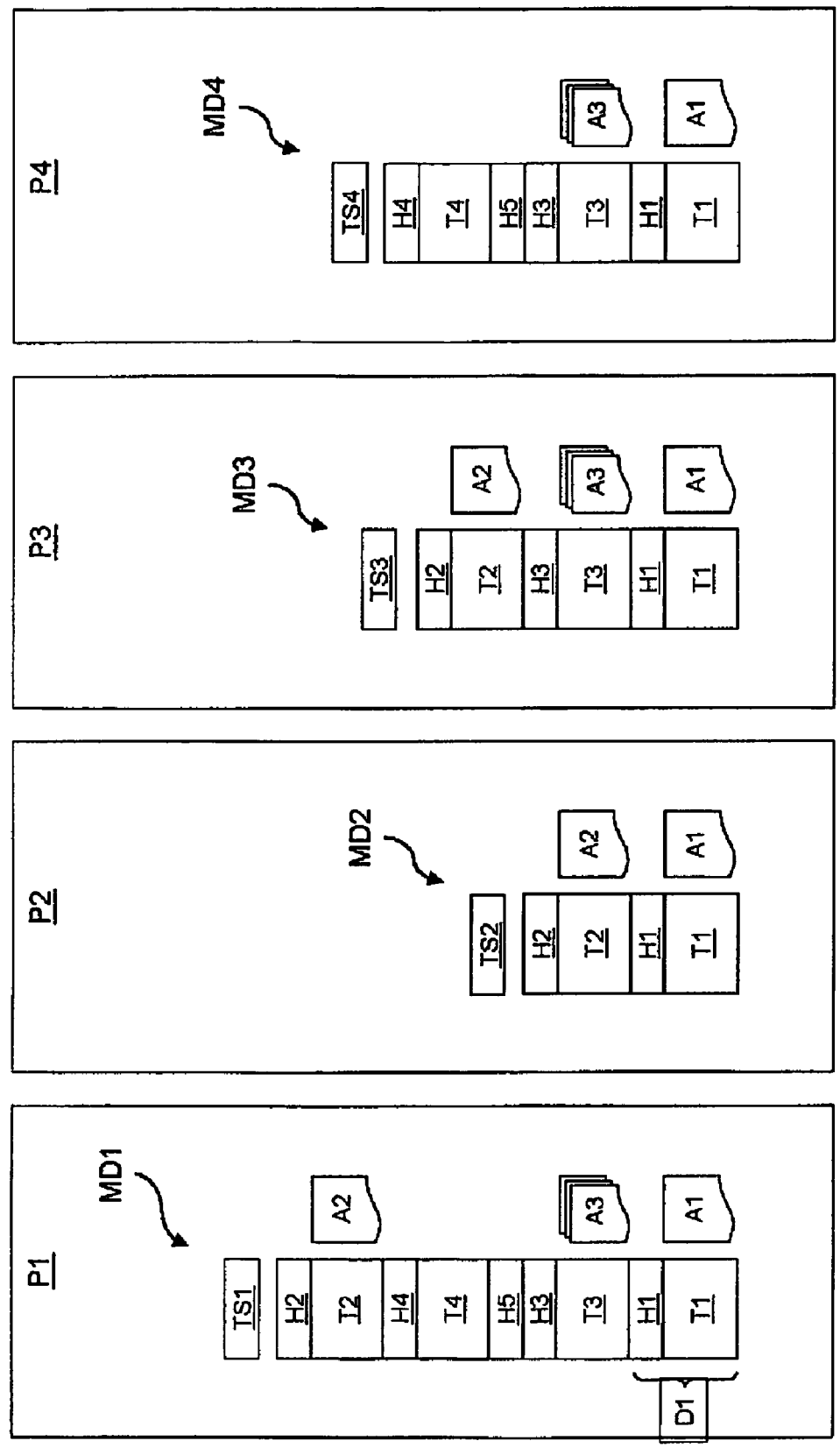
FIG. 2 illustrates master documents of each participant which include consolidated information relating to the logical subject of discussion according to an embodiment of the present invention.

FIG. 2 shows master documents MD1, MD2, MD3 and MD4 of each participant P1, P2, P3 and P4 according to an embodiment of the present invention. The master documents contain consolidated information relating to the logical subject of discussion. Each participant has its own individual master document MD1, MD2, MD3 and MD4. The master documents MD1, MD2, MD3 and MD4 among the participants P1, P2, P3 and P4 may still be different as indicated with 'no access', which is shown in Table 4.

TABLE 4

| Data | Participant P1 | Participant P2 | Participant P3 | Participant P4 |
|---|---|---|---|---|
| Document D1 (H1 & T1) | 1 | 1 | 1 | 1 |
| Attachment A1 | 1 | 1 | 1 | 1 |
| Modification M2 (H2 & T2) | 1 | 1 | 1 | 0 no access |
| Attachment A2 | 1 | 1 | 1 | 0 no access |
| Modification M3 (H3 & T3) | 1 | 0 no access | 1 | 0 no access |
| Attachment A3 | 1 | 0 no access | 1 | 0 no access |
| Header H5 | 0 no access | 0 no access | 0 no access | 1 |
| Document D4 (H4 & T4) | 1 | 0 no access | 0 no access | 1 |

The tracking section TS1, TS2, TS3 and TS4 of the master document MD1, MD2, MD3 and MD4 is inherited by each further document extracted from the master document or appended thereto when used for communication. Based on the tracking section TS1, TS2, TS3 and TS4 of the master document MD1, MD2, MD3 and MD4, a subset of documents of the master document can be selected to compose a new document to be sent.

The present invention embodiments further accommodate incomplete data/access as described below.

Based on the compression and tracking of the collections of documents within a master document, the participants of a communication are able to synchronize their master documents. For realizing such synchronization, each document sent by a participant contains the tracking section of their own master document. The document status in each descriptor is marked as 'Contents' because the data are stored in the master document and can be accessed.

In this context, the tracking section becomes a table of contents. The recipient can verify whether the documents described by the tracking section already reside in the recipient's master document/repository. If documents are missing, the recipient can add the descriptors to its own master document and mark them as status 'Reference'. In order to get the data, the participant can send a synchronization request to the originator of the received document and ask for the missing documents.

For some instances, it may be desired to keep documents in secret to avoid spreading information to participants without a 'need to know'. Access control mechanisms can be implemented by marking a subset of documents contained in the master document as hidden. This prevents the listing of these parts in the tracking section.

The tracking section in combination with a distribution list of the header section can be used to maintain a data access matrix for each participant. Thus, lack of information at another participants side can easily be identified.

Figure 3:
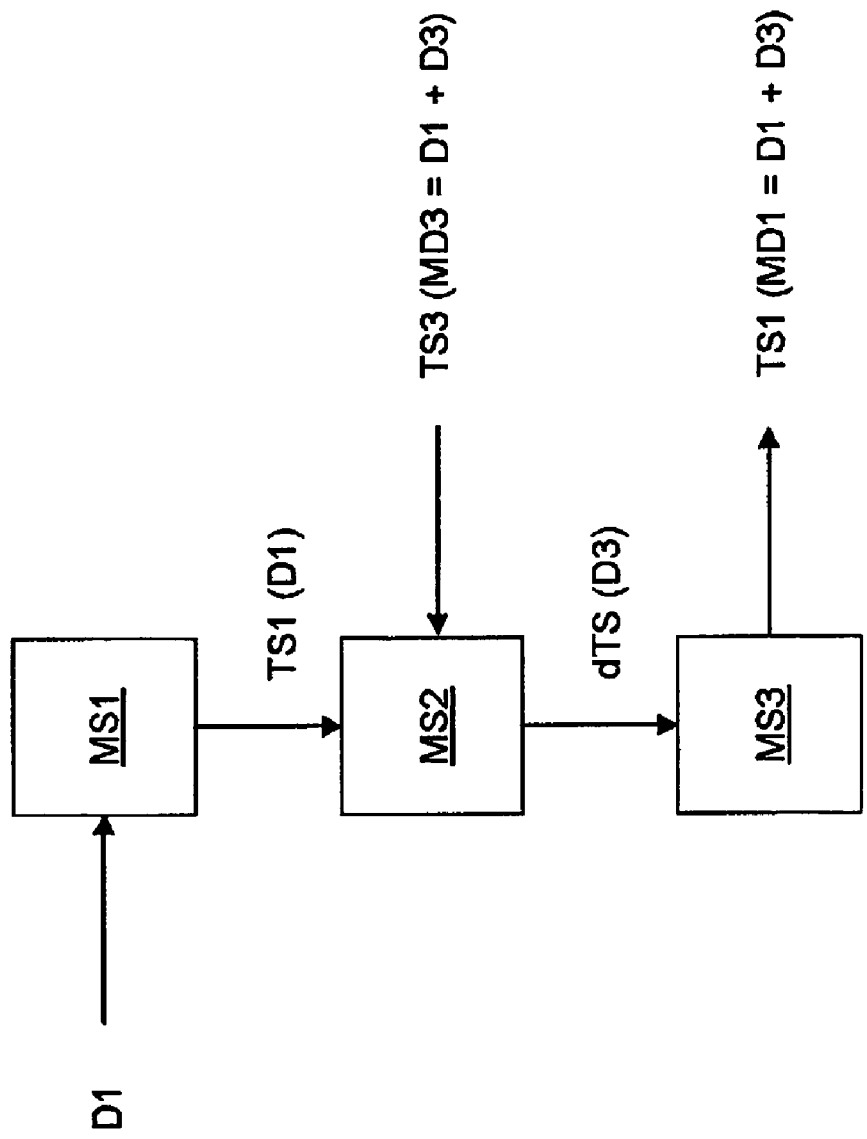
FIG. 3 is a flow chart illustrating a manner of consolidating information according to an embodiment of the present invention.

FIG. 3 depicts a flow chart illustrating a manner of consolidating information. In this example, each tracking section TSx of a master document MDx incorporates a descriptor, respectively. In step MS1, a descriptor TS1(D1) is added to the original document D1, such descriptor TS1(D1) being compared in step MS2 to a descriptor TS3(MD3=D1+D3) of an incoming master document MD3. The descriptor indicates that there is additional information dTS(D3) in MD3 relating to the same logical subject, which extends the information in original document D1. Such difference dTS(D3) is inputted to step MS3, in which the tracking section TS1 of original document D1/master document MD1 is updated to be TS1 (MD1=D1+D3). Document D1/MD1 now includes consolidated information regarding the current document exchange on this logical subject.

Figure 4:
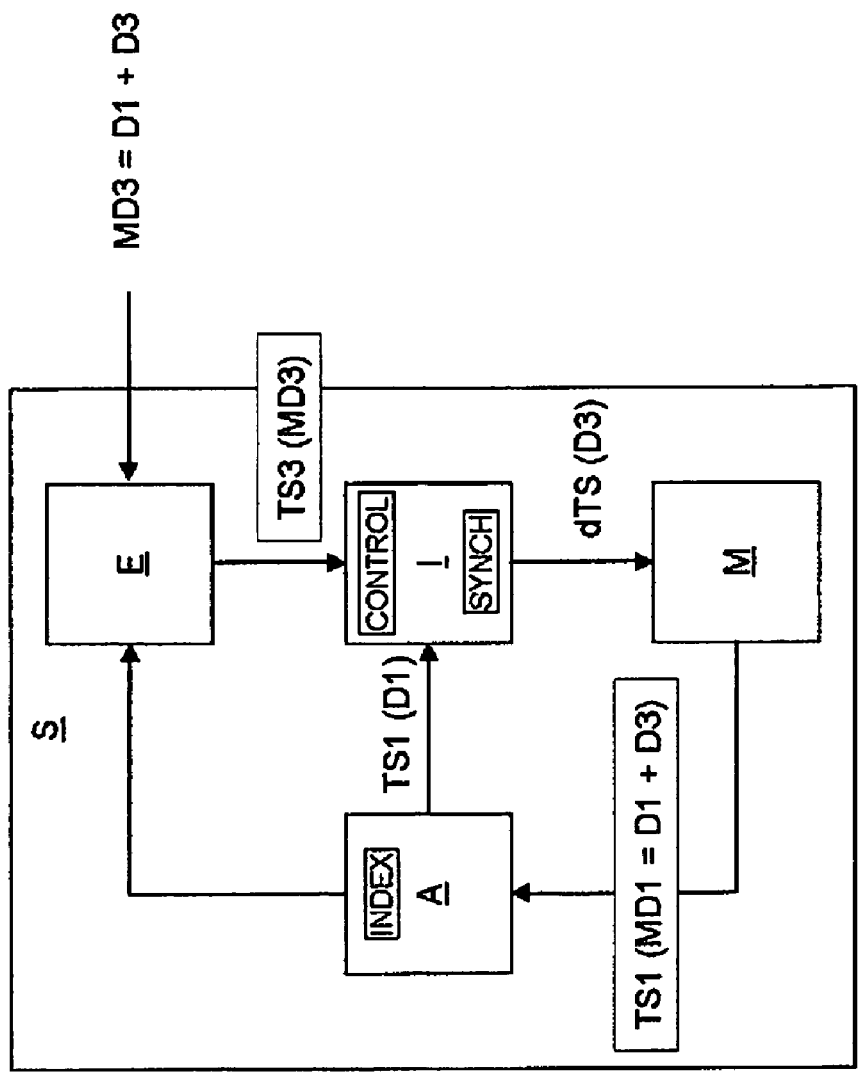
FIG. 4 is a block diagram illustrating functions of a document management and exchange system according to an embodiment of the present invention.

A hardware implementation for this technique is described. FIG. 4 shows a block diagram illustrating functions of a document management and exchange system S according to an embodiment of the present invention. Such a system incorporates an exchange unit E (Exchange) for sending and receiving documents. In this example, master document MD3 D1+D3 is received. The descriptor TS3(MD3) is received by a modification identifying unit I (Identification), in which TS3(MD3) is compared with a descriptor TS1(D1) of the original document D1. Such a descriptor is fed by an adding unit A (Adding) for adding a descriptor to the originals of documents. Adding unit A may comprise, for example, a RAM memory for storing documents. Since MD3 relates to the same logical subject as D1, information difference dTS (D3) between TS3 and TS1 is calculated by the modification identifying unit I. Such difference dTS(D3) is fed to a maintaining unit M, which updates the descriptor of TS1 (MD1=D1+D3) in the RAM memory of the adding unit A. For sending documents, adding unit A is coupled to exchange unit E for transfer thereto. The system S may optionally comprise synchronizing unit (SYNCH) for synchronizing a received document with a master document across a network. The synchronizing unit is optionally formed integrally with the modification identifying unit I for conducting and distributing a respective request. Furthermore, the system S may comprise a controlling unit (CONTROL) for controlling access to a master document based on a data access matrix for each participant. Although the controlling unit is preferably formed integrally with the modification identifying unit I, the matrix may be stored and supplied separately (e.g., by a RAM memory of the adding unit A as described above). The same applies with an index table (INDEX) for speeding up finding of a master document via indexes. Thus, system S allows for rapid consolidation of documents relating to the same logical subject, whether across a network or in a standalone system.

While the invention has been described in detail with reference to example embodiments thereof, it will be apparent to one of ordinary skill in the art that various changes and modifications can be made therein without departing from the spirit and scope thereof. It should be understood, however, that the drawings and detailed description presented herein are not intended to limit the invention to the particular embodiments disclosed, but rather, the intention is to cover all modifications, equivalents, and alternatives falling within the spirit and the scope of the present invention as defined by the appended claims.

What is claimed is:

1. A method of consolidating information in a document management and exchange system, the method comprising:
    adding a descriptor to an original document for exchange between two or more participant systems along a communication path, wherein the descriptor comprises at least one document identifier representing a logical subject of the document;
    identifying in further documents received from the communication path at the two or more participant systems modifications with respect to the original document based on comparing a descriptor of the further documents and the descriptor of the original document, wherein the further documents represent modified versions of the original document exchanged between the two or more participant systems, and wherein at least one participant system receives a further document with modifications different than modifications in another further document received by at least one other participant system; and
    maintaining a master document for each of the participant systems containing the original document and the modifications in the further documents received by that participant system from the communication path during the exchange of the modified versions of the original document between the two or more participant systems, the master document for each participant system providing consolidated information relating to the logical subject and the modifications received by that participant system, and wherein the master documents for at least two of the participant systems are different and include different modifications based on the further documents received at those at least two participant systems.

2. The method according to claim 1, wherein the original document comprises a collection of documents and a descriptor is added to each of the collected documents.

3. The method according to claim 1, wherein modifications to the master document are stored in their timely sequence.

4. The method according to claim 1, wherein the master document is located by an index that is assigned to logical subjects.

5. The method according to claim 1, wherein new information is added or merged into the master document.

6. The method according to claim 1, wherein redundant information is deleted from the master document.

7. The method according to claim 6, wherein redundant documents and/or attachments to the documents are deleted.

8. The method according to claim 1, wherein the descriptor is inherited by each document extracted from the master document or appended to the master document when used for communication.

9. The method according to claim 1, further comprising:
    synchronizing the master document based on comparing the descriptor of a received document and the descriptor of the master document, wherein the descriptor further comprises administrative information of properties of each document.

10. The method according to claim 9, wherein synchronization is partly or completely denied based on authorization information relating to individual participants.

11. The method according to claim 1, wherein the complete master document or modifications to the master document are sent or received.

12. The method according to claim 11, wherein a subset of documents contained in the master document can be marked as hidden and therefore not be listed in the descriptor when used for communication.

13. A program product apparatus comprising a computer usable memory device embodying program instructions executable by one or more computers for performing a method of consolidating information in a document management and exchange system, the method comprising:
    adding a descriptor to an original document for exchange between two or more participant systems along a communication path, wherein the descriptor comprises at least one document identifier representing a logical subject of the document;
    identifying in further documents received from the communication path at the two or more participant systems modifications with respect to the original document based on comparing a descriptor of the further documents and the descriptor of the original document, wherein the further documents represent modified versions of the original document exchanged between the two or more participant systems, and wherein at least one participant system receives a further document with modifications different than modifications in another further document received by at least one other participant system; and
    maintaining a master document for each of the participant systems containing the original document and the modifications in the further documents received by that participant system from the communication path during the exchange of the modified versions of the original document between the two or more participant systems, the master document for each participant system providing consolidated information relating to the logical subject and the modifications received by that participant system, and wherein the master documents for at least two of the participant systems are different and include different modifications based on the further documents received at those at least two participant systems.

14. The apparatus of claim 13, wherein the complete master document or modifications to the master document are sent or received, and wherein a subset of documents contained in the master document can be marked as hidden and therefore not be listed in the descriptor when used for communication.

15. A document management and exchange system adapted for consolidating information comprising:
one or more computer systems including:
means for adding a descriptor to an original document for exchange between two or more participant computer systems along a communication path, wherein the descriptor comprises at least one document identifier representing a logical subject of the document;
means for identifying in further documents received from the communication path at the two or more participant computer systems modifications with respect to the original document based on comparing a descriptor of the further documents and the descriptor of the original document, wherein the further documents represent modified versions of the original document exchanged between the two or more participant computer systems, and wherein at least one participant computer system receives a further document with modifications different than modifications in another further document received by at least one other participant computer system; and
means for maintaining a master document for each of the participant computer systems containing the original document and the modifications in the further documents received by that participant computer system from the communication path during the exchange of the modified versions of the original document between the two or more participant computer systems, wherein the master document for each participant computer system provides consolidated information relating to the logical subject and the modifications received by that participant computer system, and wherein the master documents for at least two of the participant computer systems are different and include different modifications based on the further documents received at those at least two participant computer systems.

16. A document management and exchange system comprising:
one or more computer systems including:
a descriptor adding unit to add a descriptor to an original document for exchange between two or more participant computer systems along a communication path, wherein the descriptor comprises at least one document identifier representing a logical subject of the document;
a modification identifying unit to identify in further documents received from the communication path at the two or more participant computer systems modifications with respect to the original document based on comparing a descriptor of the further documents and the descriptor of the original document, wherein the further documents represent modified versions of the original document exchanged between the two or more participant computer systems, and wherein at least one participant computer system receives a further document with modifications different than modifications in another further document received by at least one other participant computer system; and
a master document maintaining unit to maintain a master document for each of the participant computer systems containing the original document and the modifications in the further documents received by that participant computer system from the communication path during the exchange of the modified versions of the original document between the two or more participant computer systems, wherein the master document for each participant computer system provides consolidated information relating to the logical subject and the modifications received by that participant computer system, and wherein the master documents for at least two of the participant computer systems are different and include different modifications based on the further documents received at those at least two participant computer systems.

17. The system according to claim 16, wherein the descriptor comprises at least one unique document identifier relating to a part of a document.

18. The system according to claim 17, wherein the document identifier relates to one of a header section, a text area or an attachment of a document.

19. The system according to claim 17, wherein the document identifier is independent from the textual description of a document.

20. The system according to claim 16, further comprising:
an index table for locating the master document via indexes of the table, each of the indexes being assigned to a logical subject.

21. The system according to claim 16, further comprising:
a synchronization unit to synchronize a received document with the master document based on comparing the descriptor of each of the documents, the descriptors further including administrative information of properties of each document.

22. The system according to claim 21, wherein the administrative information comprises at least one of a time stamp, attachment name or document status.

23. The system according to claim 16, further comprising:
a control unit to control access to the master document based on a data access matrix for each participant, the matrix including access authorization information of the participants to master documents and being based on the descriptors of the master documents and a distribution list.

24. The system according to claim 16, wherein the master documents of individual participant computer systems are stored in a distributed computer network.

25. The system according to claim 16, wherein the system includes an e-mail system.

* * * * *